June 29, 1937.  J. M. PROOD  2,085,169
BROILER
Filed Nov. 6, 1935   2 Sheets-Sheet 1
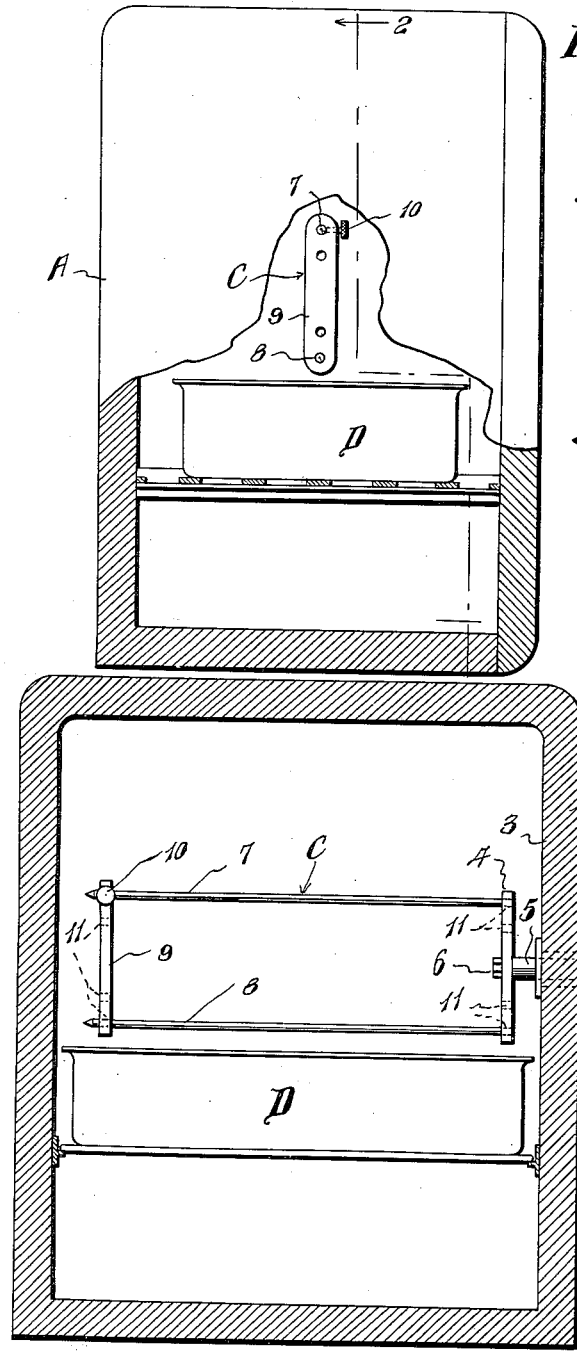
Fig. 1.
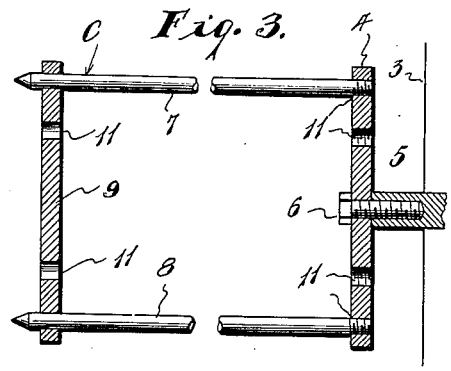
Fig. 3.
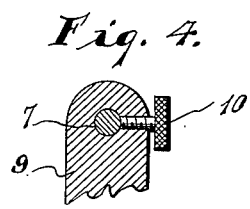
Fig. 4.
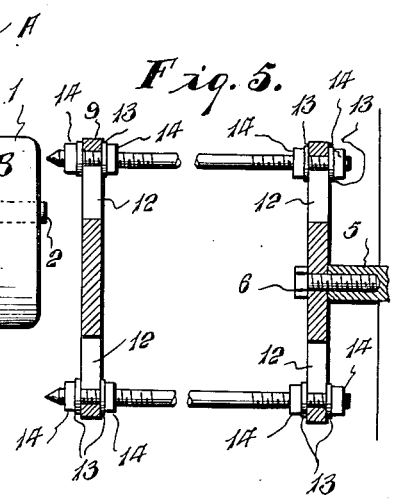
Fig. 5.
Fig. 2.
Inventor
John M. Prood,
By John Patton Duffie
Attorney June 29, 1937.     J. M. PROOD     2,085,169
BROILER
Filed Nov. 6, 1935     2 Sheets-Sheet 2

Inventor
John M. Prood,

Patented June 29, 1937

2,085,169

UNITED STATES PATENT OFFICE 2,085,169

BROILER

John M. Prood, Louisville, Ky.

Application November 6, 1935, Serial No. 48,577

2 Claims. (Cl. 53—5)

This invention relates generally to broilers, and more especially to a device or mechanism used in the preparation of meats, poultry, ham and other foods which depend upon, or would be improved by a rotating motion while in the process of preparation.

This invention is primarily intended for use in connection with household or commercial types of ovens, broilers, or grilles heated by gas, electricity or other means.

The primary object of the invention is to improve the results obtained in the preparation of foods as stated above, and such improved results are obtained by employing the following principles:

*First.*—By providing uniform temperature to all portions of the article of food under preparation, by rotating same slowly and smoothly while in the heated oven.

*Second.*—By providing means of automatic self-basting, throughout the period of preparation, or for whatever period is considered necessary. This feature is provided by the use of a drip pan or receptacle directly beneath the rotating article of food, containing a supply of liquid, which may be either plain water, or a mixture containing seasoning, flavoring, or curing materials, as desired. Said drip pan or receptacle is so arranged that it may be adjusted to any desired elevation in the oven and to any desired distance from the revolving food holder, in order to accommodate articles of food of different size, and permit easy removal of the food and food holder when the preparation of the food is completed. As the food rotates, the portion immersed in the liquid in the drip pan or receptacle picks up a small supply of the liquid, and in turn any drippings from the food are caught by the pan and become part of the basting material. This constant picking up of the basting material, at a slow, uniform rate (controlled by the adjustment of the rotating speed) prevents excessive evaporation of the natural juices of the food, and the losses of important food elements.

*Third.*—By eliminating direct contact with containers, such as pots, pans, roasters, or other utensils, thereby preventing sticking and other bad effects.

With the foregoing and other objects in view that will appear as the nature of my invention is better understood, the same consists in the novel features of construction, combination and arrangement of parts illustrated in the accompanying drawings and more particularly pointed out in the appended claims.

In the accompanying drawings, which are for illustrative purposes only and are therefore not drawn to scale:

Figure 1 is an end view, partly in section, illustrating the application of my invention.

Figure 2 is a vertical longitudinal section, taken on line 2—2 of Figure 1, looking in the direction indicated by the arrows.

Figure 3 is an enlarged sectional view, showing one method of adjustably connecting the prongs to the base bar or plate of the rotary food holder.

Figure 4 is an enlarged detail sectional view of the clamping bar and set screw.

Figure 5 is a view similar to Figure 3, showing another method of adjustably connecting the prongs to the base bar or plate of the rotary food holder.

Figure 6:
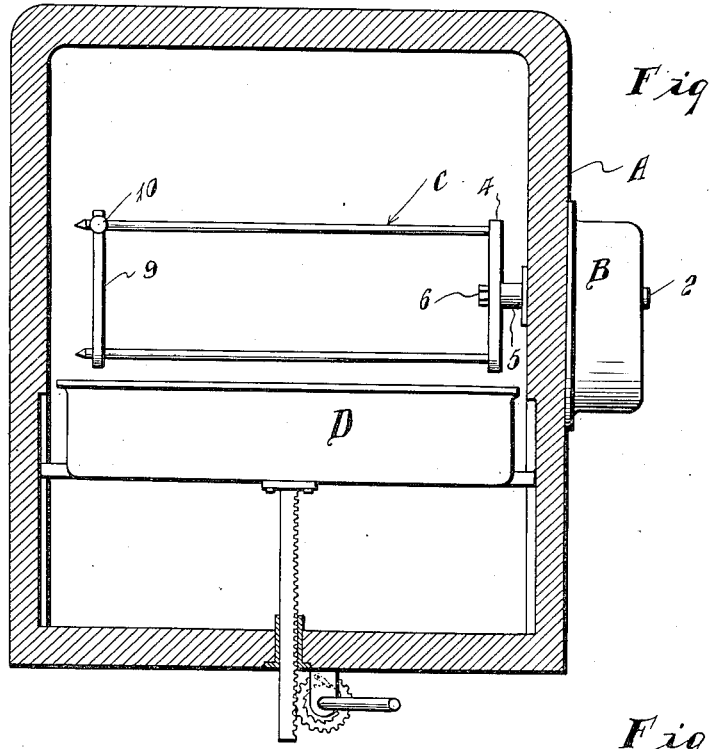
Figure 6 is a vertical longitudinal section, showing how the drip pan or receptacle may be adjustably mounted in the oven.
Figure 7:
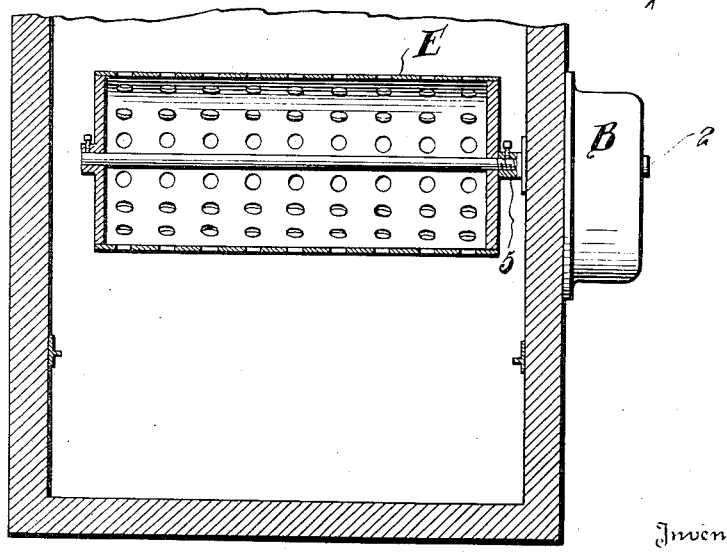
Figure 7 is a fragmentary sectional view, showing a form of holder that may be used in the preparation of foods, other than meat.

Referring to the drawings for a more particular description of my invention, and in which drawings like parts are designated by like reference characters throughout the several views, A indicates the oven, B the driving device, C the rotating food holder and D the drip pan or receptacle for holding the basting liquid and for catching drippings from the food during the course of preparation.

The driving device B may consist of an electric motor 1 or other driving means of fixed or variable speed, and is situated exteriorly of the oven A and provided with a horizontal shaft 2, extending through the adjacent oven wall 3 into the interior of the oven.

The rotating food holder comprises the base bar or plate 4, which is removably attached to the inner projecting end 5 of the shaft 2, by the screw 6 or other equivalent means, and two or more horizontally disposed parallel prongs 7 and 8, respectively, disposed at right angles to the base bar or plate. The food holder further comprises a clamping bar or plate 9, slidable along the prongs 7 and 8 and adapted to be adjusted in any desired position, depending on the nature and size of the article of food to be prepared, by the set screw 10, or other equivalent means.

The rotary food holder may be easily and readily attached and removed, depending on whether or not its use is required for the particular purpose. When detached, there will be no obstruction in the oven that might interfere with or prevent the use of the oven for any purpose not requiring this device, such as in the preparation of cakes, pies, etc.

The prongs 7 and 8 of the food holder may be adjusted closer together or farther apart to accommodate the particular article of food to be prepared by suitable means. For example, by providing the clamping bar or plate 9 with transverse perforations 11 to receive the corresponding ends of the prongs, as illustrated in Figure 3 of the drawings, or by forming the clamping bar with elongated slots 12 to receive the adjacent ends of the prongs and employing washers and nuts 13 and 14, as illustrated in Figure 5.

In the event foods other than meats are to be prepared, such, for example, as pop-corn, nuts, etc., I employ a revolving perforated cylindrical container E, in place of the food holder previously described, and this cylindrical container is removably connected to and actuated by the horizontal shaft 2 of the driving device B in the manner illustrated in Figure 6 of the drawings.

As shown, the drip pan or receptacle D is mounted in the oven directly beneath the rotary food holder. As illustrated in Figure 6 of the drawings, the drip pan or receptacle may be so arranged that it can be adjusted to any desired elevation in the oven and any desired distance from the revolving food holder, in order to accommodate articles of food of different size and permit easy removal of the food and food holder when the preparation of the food is completed. The desired adjustment of the drip pan may be accomplished by the depending rack 15 and pinion 16.

Among the many advantages derived through the use of my invention, some of the more important may be briefly enumerated as follows:

1. Improved flavor is obtained, due to the retention of natural juices and other properties, and the constant addition of flavored basting material.

2. Improved texture and quality is obtained. This is characterized by tenderness in the case of meats.

3. Possibility of failure due to over-heating, sticking to container or other factors dependent on human element, is eliminated.

4. Simplified preparation by the elimination of the need for frequent inspection, basting and turning of the food in the holder.

5. Makes possible the use of cheaper cuts of meats with good results.

6. Wider range of the use of cooking facilities.

From the foregoing description taken in connection with the drawings, it is thought that the construction, operation and advantages of my invention will be readily understood, without requiring a more extended explanation.

Various changes in the form, proportions and minor details of construction may be resorted to without departing from the principles or sacrificing any of the advantages of my invention, as defined in the appended claims.

Having described my invention, what I claim as new and desire to secure by Letters Patent, is:

1. In a device of the character specified, a rotary food holder, comprising a base bar, a plurality of parallel prongs carried by and disposed at right angles to said base bar, a clamping bar slidable along said prongs, means for adjustably and detachably connecting one end of the prongs to the base bar and means for holding the clamping bar in adjusted position.

2. In a device of the character specified, a rotary food holder comprising a base bar formed at each end with a plurality of transverse longitudinally spaced threaded openings, a plurality of parallel prongs formed with inner threaded ends having screw threaded engagement with the threaded openings of the base bar, a clamping bar having transverse openings co-incident with the threaded openings in the base bar to receive the outer ends of the prongs and a set screw for holding the clamping bar in adjusted position along the prongs.

JOHN M. PROOD.